United States Patent
Hui et al.

(10) Patent No.: US 10,113,612 B2
(45) Date of Patent: Oct. 30, 2018

(54) LINE TENSIONER

(71) Applicant: TECK KEUNG INDUSTRIAL LIMITED, Hong Kong (CN)

(72) Inventors: Conway Kin Wai Hui, Hong Kong (CN); Chi Hung Kung, Hong Kong (CN)

(*) Notice: Subject to any disclaimer, the term of this patent is extended or adjusted under 35 U.S.C. 154(b) by 0 days.

(21) Appl. No.: 15/317,409

(22) PCT Filed: Jun. 9, 2014

(86) PCT No.: PCT/CN2014/079478
§ 371 (c)(1),
(2) Date: Dec. 9, 2016

(87) PCT Pub. No.: WO2015/188302
PCT Pub. Date: Dec. 17, 2015

(65) Prior Publication Data
US 2017/0114863 A1  Apr. 27, 2017

(51) Int. Cl.
*F16G 11/12* (2006.01)
*F16G 11/04* (2006.01)
*F16G 11/10* (2006.01)

(52) U.S. Cl.
CPC ............ *F16G 11/12* (2013.01); *F16G 11/046* (2013.01); *F16G 11/103* (2013.01); *Y10T 24/3918* (2015.01)

(58) Field of Classification Search
CPC ...... F16G 11/12; F16G 11/046; F16G 11/103; Y10T 24/3916; Y10T 24/3918
See application file for complete search history.

(56) References Cited

U.S. PATENT DOCUMENTS

| 712,408 | A | * | 10/1902 | Priddat | ................. | B65D 63/14 |
| | | | | | | 24/130 |
| RE12,147 | E | * | 8/1903 | Priddat | ................. | B65D 63/14 |
| | | | | | | 24/130 |

(Continued)

FOREIGN PATENT DOCUMENTS

| CN | 101765728 A | 6/2010 |
| CN | 202048139 A | 11/2011 |

(Continued)

OTHER PUBLICATIONS

State Intellectual Property Office of the People's Republic of China (SIPO), International Search Report (ISR), dated Jan. 4, 2015, pp. 1-4, SIPO.

(Continued)

*Primary Examiner* — Robert Sandy

(57) ABSTRACT

A line tensioner and methods of tensioning a line, the line tensioner with a first attachment portion for releasably fixing to a line. The first attachment portion has a slot with two opposing surfaces extending in a first direction from a throat towards a mouth. The line is receivable via the mouth into releasable gripping engagement with the two opposing surfaces. The line tensioner also has a bearing portion, with the line being slidably engagable with the bearing portion for tensioning the line. The line tensioner has a second attachment portion for releasably fixing to the line. The second attachment portion has a slot with two opposing surfaces extending in a second direction from a throat towards a mouth. The line is receivable via the mouth into releasable gripping engagement with the two opposing surfaces. The second direction is opposite to the first direction.

3 Claims, 10 Drawing Sheets

(56) References Cited

U.S. PATENT DOCUMENTS

| | | | |
|---|---|---|---|
| 1,020,963 A * | 3/1912 | Cake | B65D 63/14 |
| | | | 24/130 |
| 1,322,410 A | 11/1919 | Connelly | |
| 1,612,396 A * | 12/1926 | Redmond | A01F 1/02 |
| | | | 100/34 |
| 2,450,358 A * | 9/1948 | Romano | B65D 63/14 |
| | | | 24/115 J |
| 3,398,714 A | 8/1968 | Wallin et al. | |
| 5,307,751 A | 5/1994 | Shell | |
| D629,288 S | 12/2010 | Kelleghan | |
| 8,001,659 B2 | 8/2011 | Sorensen | |
| 8,661,624 B1 | 3/2014 | Bracewell | |
| 2006/0054070 A1 | 3/2006 | Lopes Praca | |
| 2008/0110000 A1 | 5/2008 | Orr | |
| 2009/0241296 A1 | 10/2009 | Sorensen | |
| 2013/0145582 A1 | 6/2013 | Chupp | |

FOREIGN PATENT DOCUMENTS

| | | | |
|---|---|---|---|
| EP | 1930624 A | 6/2008 | |
| FR | 2855227 A | 11/2004 | |

OTHER PUBLICATIONS

European Patent Office (EPO) Machine-Generated Translator, English translation of FR2855227, Sep. 26, 2018, EPO, Munich, Germany.

* cited by examiner

LINE TENSIONER

TECHNICAL FIELD

The present invention relates to line tensioners. The present invention is described herein in relation to, but is not limited to, tensioning rope, cord, string, and other similar types of line for such purposes as tying together items and stabilizing items in relation to each other.

BACKGROUND ART

Prior line tensioners include devices that are quite complicated to use. Some prior tensioning devices also have moving components such as latches and spring-loaded clamps. As well as adding to the complexity of the device these moving components can also be prone to breaking or damage, thereby compromising the durability of the device.

One line tensioner is described by U.S. Pat. No. 8,001,659. This line tensioner, however, can be difficult to use and users typically need to refer to instructions, such as written instructions on packaging that comes with the line tensioner or a video, in order to use the line tensioner properly. Also, a hook formation on the line tensioner is used as a cord block. A cord, however, can be prone to slipping off the hook formation compromising the effectiveness of the line tensioner. Furthermore, the aperture through which a first portion of cord is attached is not in alignment with the cord block. This reduces the stability of the line tensioner in use especially when tensioning forces are applied.

DISCLOSURE OF INVENTION

Technical Problem

It is an object of the present invention to overcome or ameliorate at least one of the disadvantages of the prior art, or to provide a useful alternative.

Solution to Problem

Technical Solution

A first aspect of the present invention provides a line tensioner comprising:

a first attachment portion for releasably fixing to a line, the first attachment portion having a slot with two opposing surfaces extending in a first direction from a throat towards a mouth, the line being receivable via the mouth into releasable gripping engagement with the two opposing surfaces;

a bearing portion, the line being slidably engageable with the bearing portion for tensioning the line; and a second attachment portion for releasably fixing to the line, the second attachment portion having a slot with two opposing surfaces extending in a second direction from a throat towards a mouth, the line being receivable via the mouth into releasable gripping engagement with the two opposing surfaces, the second direction being opposite to the first direction.

A second aspect of the present invention provides a method of tensioning a line using a line tensioner as described above, the method comprising:

releasably fixing a first portion of the line to the first attachment portion;

engaging a second portion of the line with the bearing portion;

pulling a third portion of the line, the second portion of the line being between the first and third portions of the line, such that the second portion of the line slides along and bears against the bearing portion to tension the line; and releasably fixing the third portion of the line to the second attachment portion.

A third aspect of the present invention provides a method of tensioning a line using a line tensioner as described above, wherein a first portion of the line is attached to a first item, the method comprising:

releasably fixing the first attachment portion to a second item;

engaging a second portion of the line with the bearing portion;

pulling a third portion of the line, the second portion of the line being between the first and third portions of the line, such that the second portion of the line slides along and bears against the bearing portion to tension the line; and releasably fixing the third portion of the line to the second attachment portion.

Further features of various embodiments of the present invention are defined in the appended claims. It will be appreciated that features may be combined in various combinations in various embodiments of the present invention.

Throughout this specification, including the claims, the terms "comprise", "comprising", and other like terms are to be construed in an inclusive sense, that is, in the sense of "including, but not limited to", and not in an exclusive or exhaustive sense, unless explicitly stated otherwise or the context clearly requires otherwise.

BRIEF DESCRIPTION OF DRAWINGS

Description of Drawings

Figure 1:
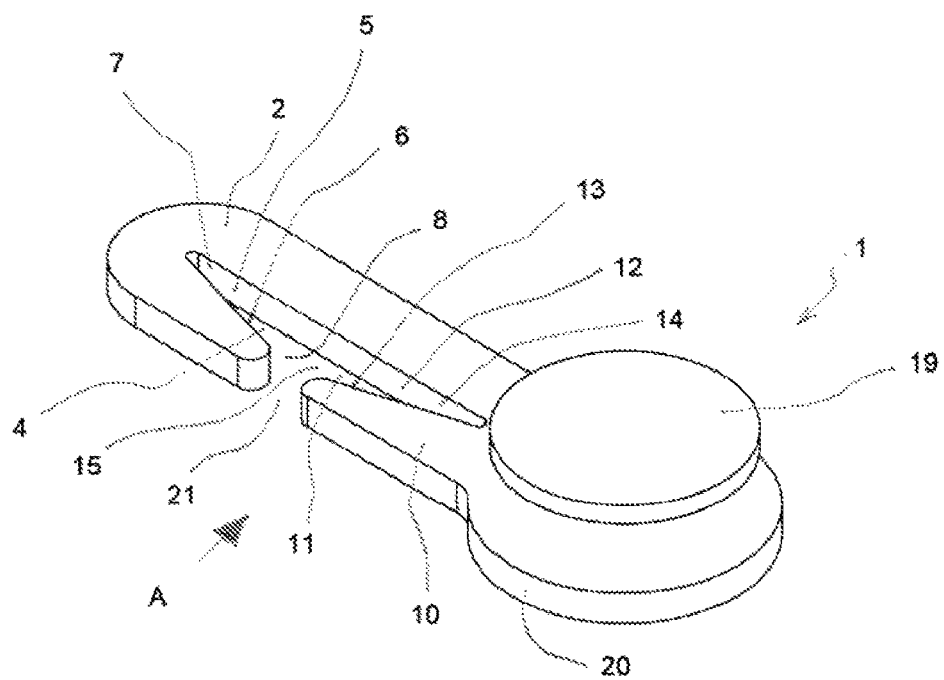
Figure 2:
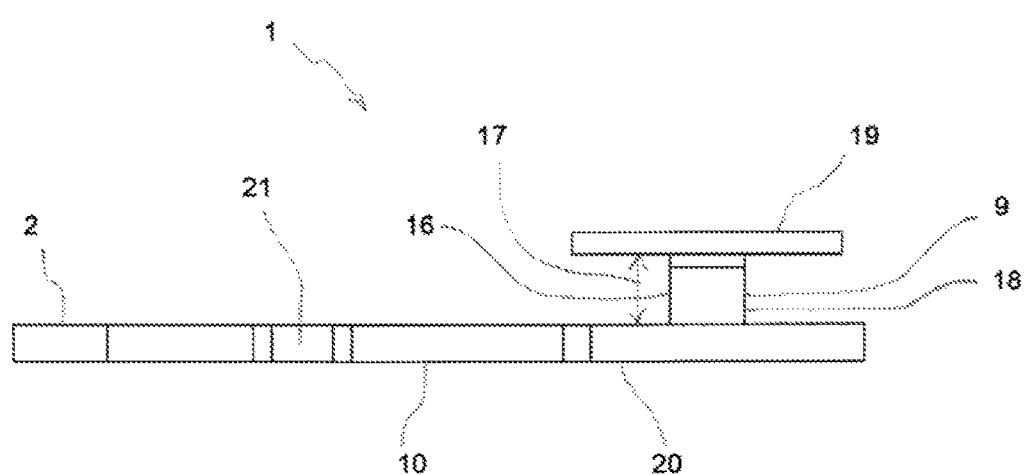
Figure 3:
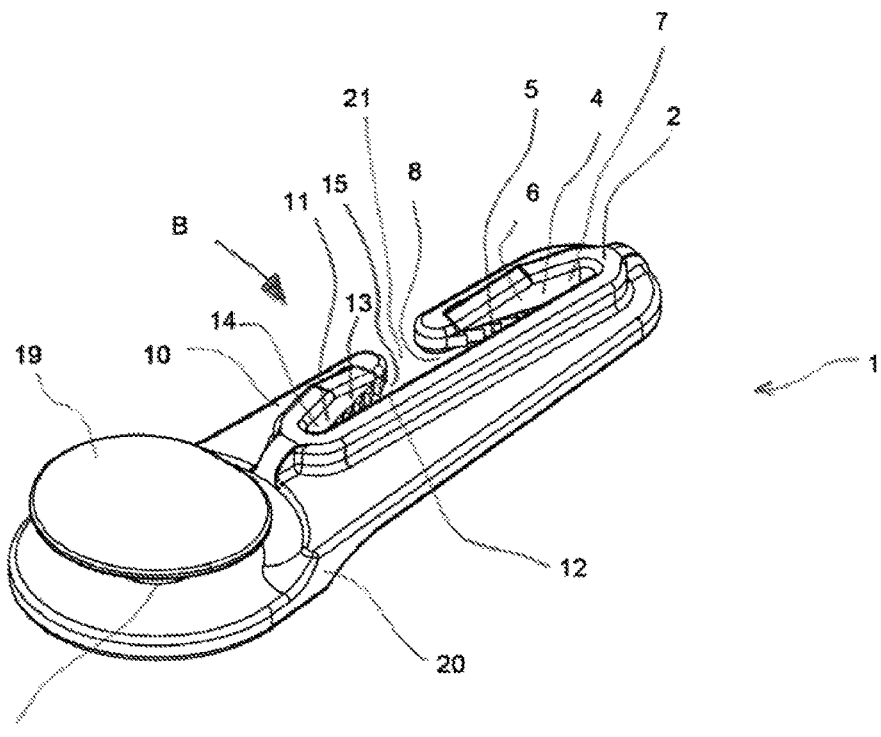
Figure 4:
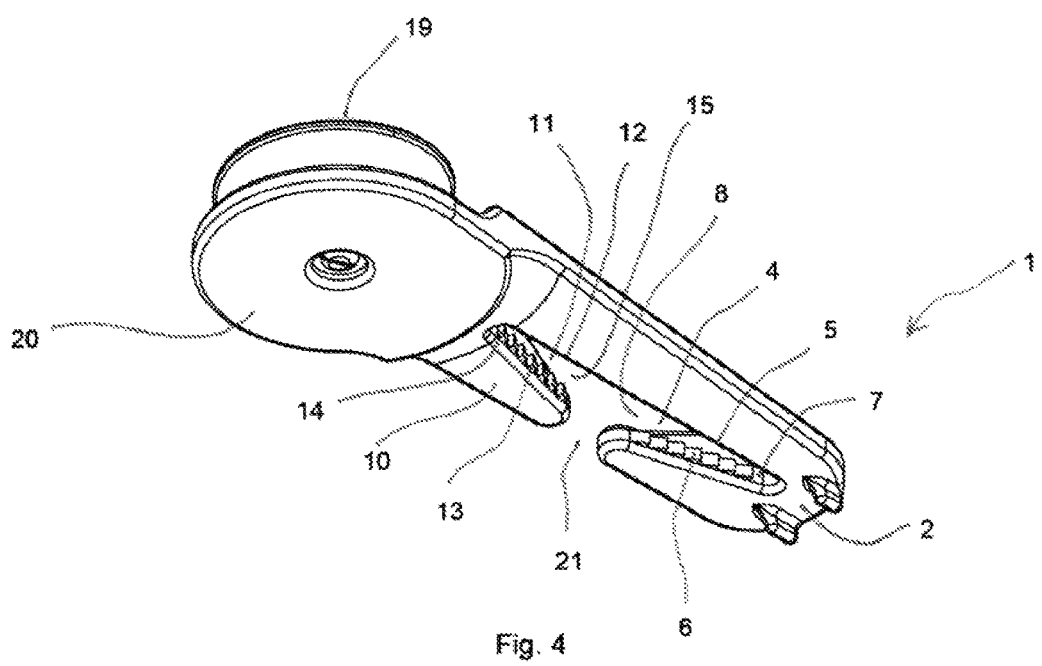
Figure 5:
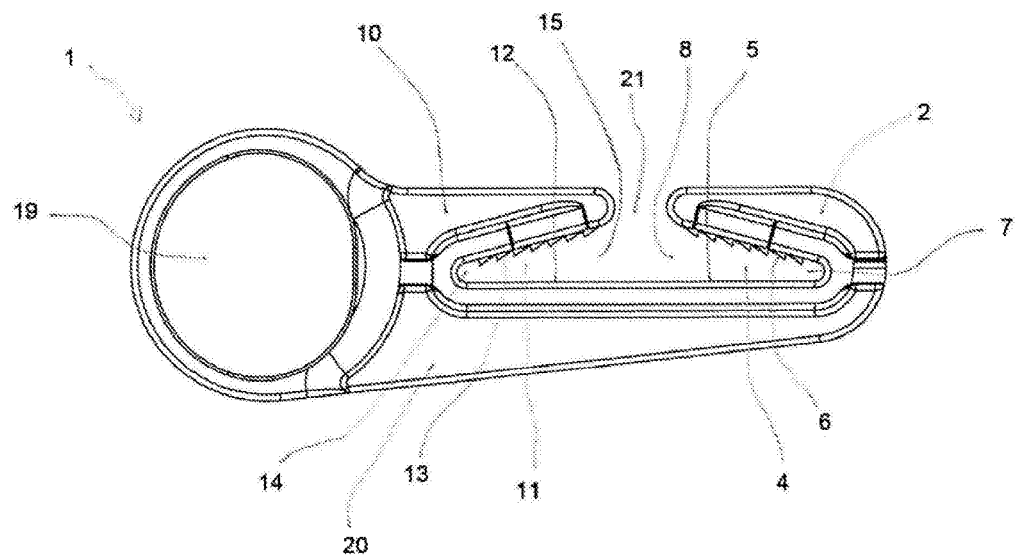
Figure 6:
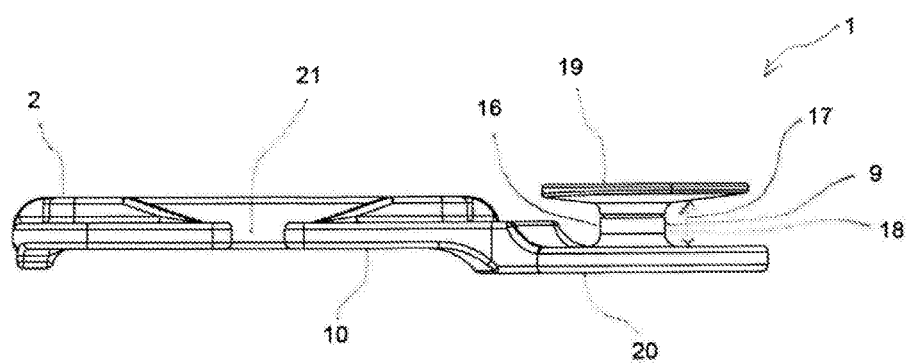
Figure 7:
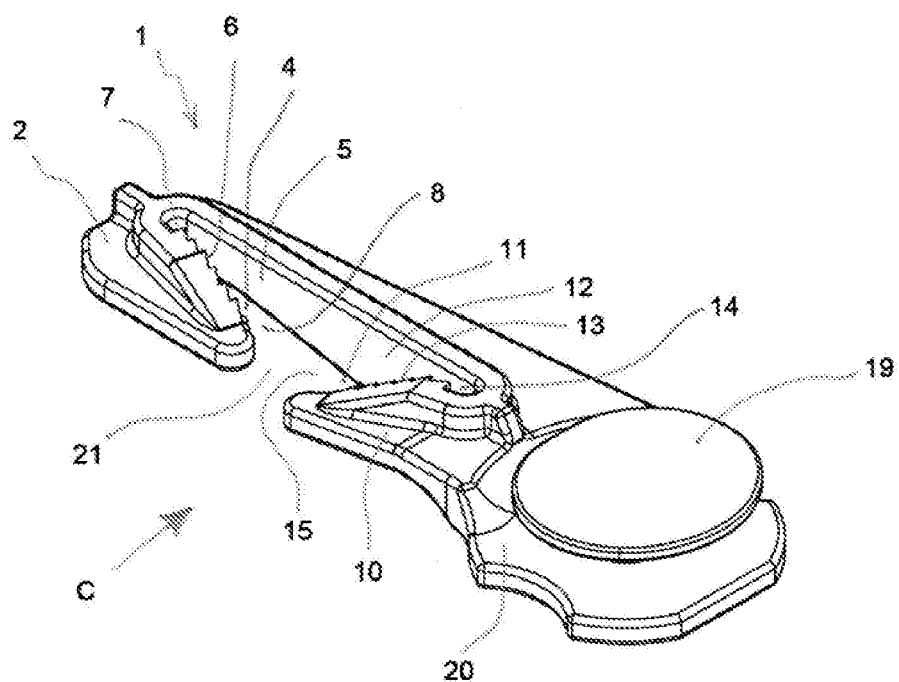
Figure 8:
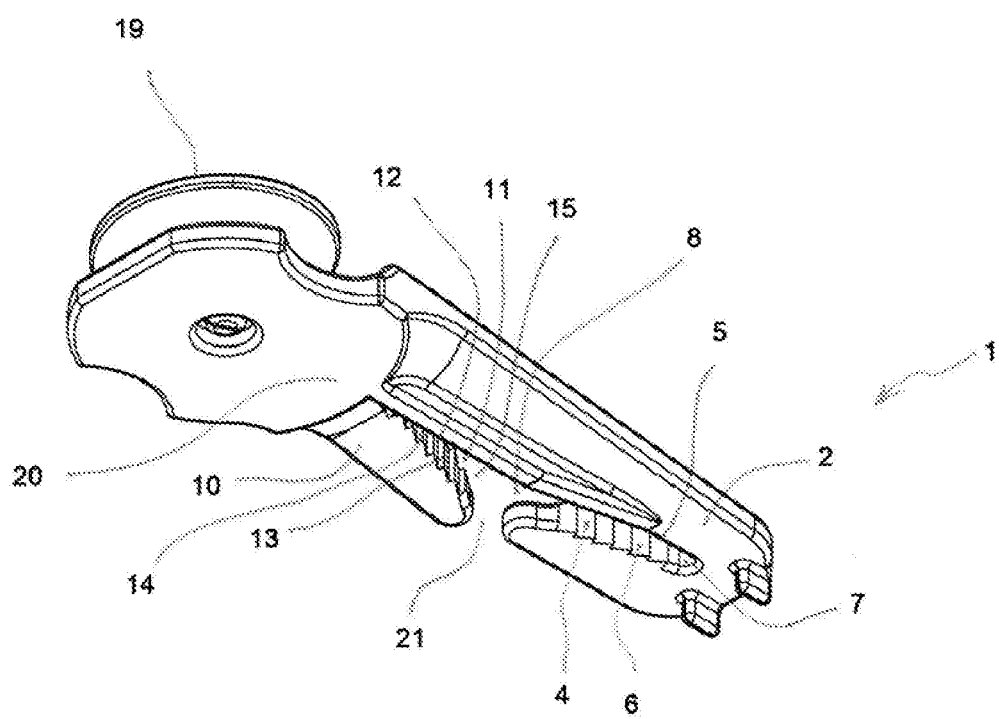
Figure 9:
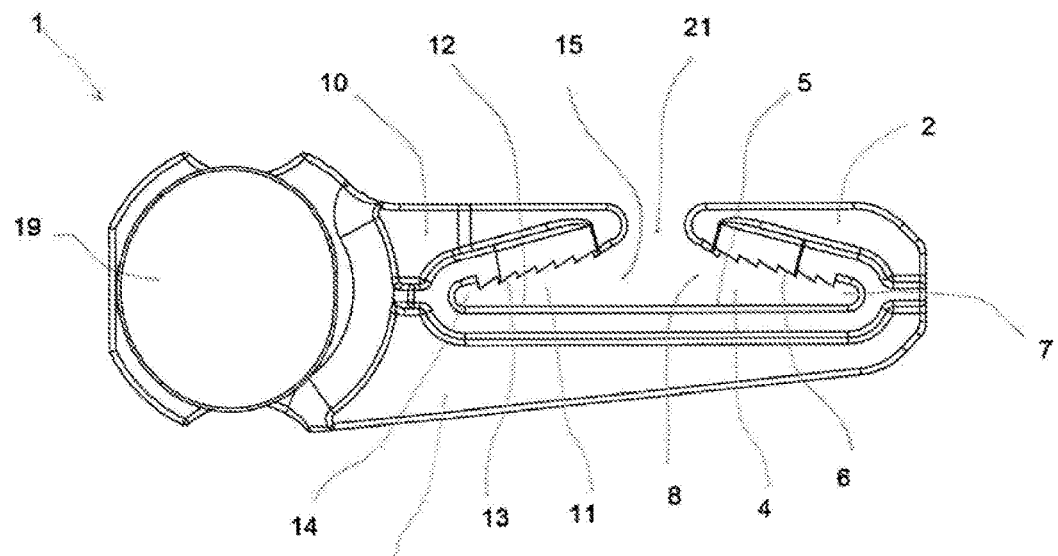
Figure 10:
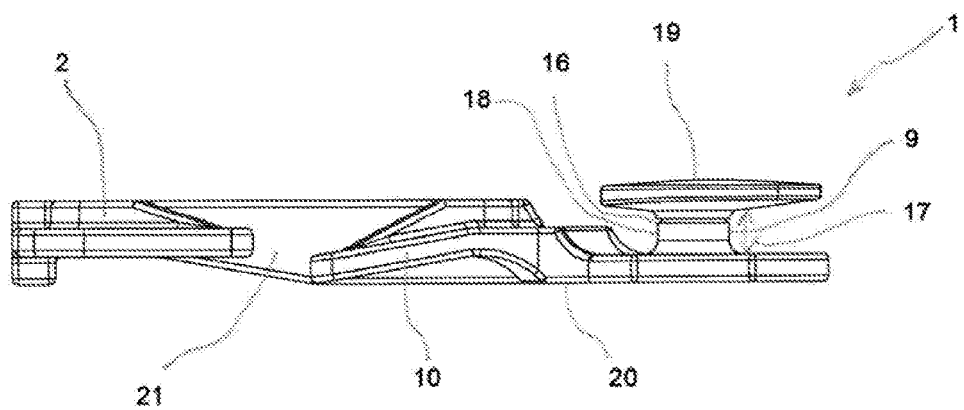
Figure 11:
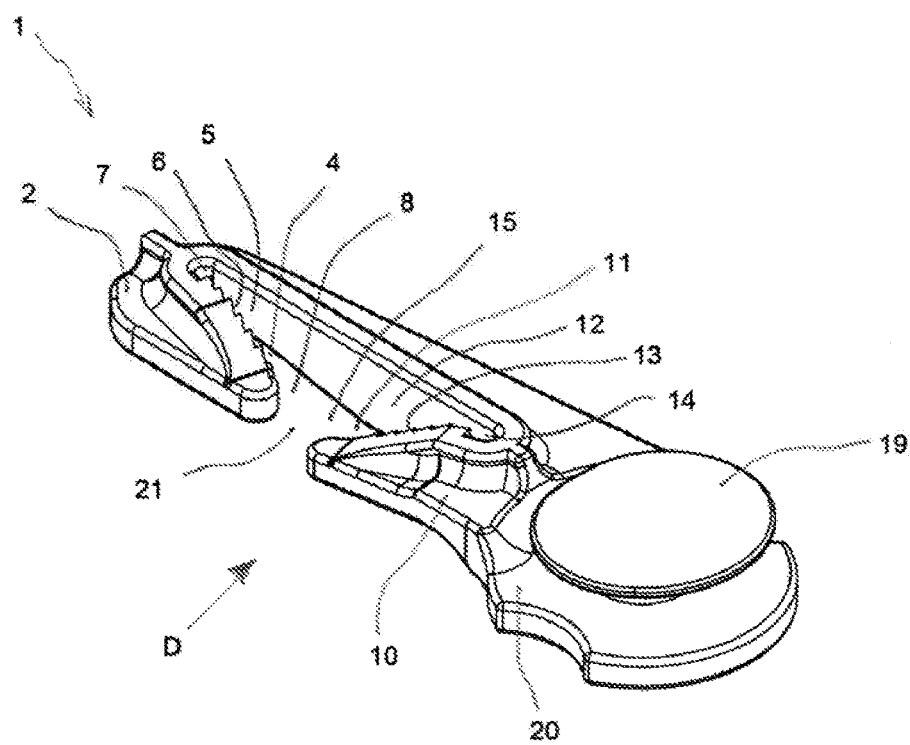
Figure 12:
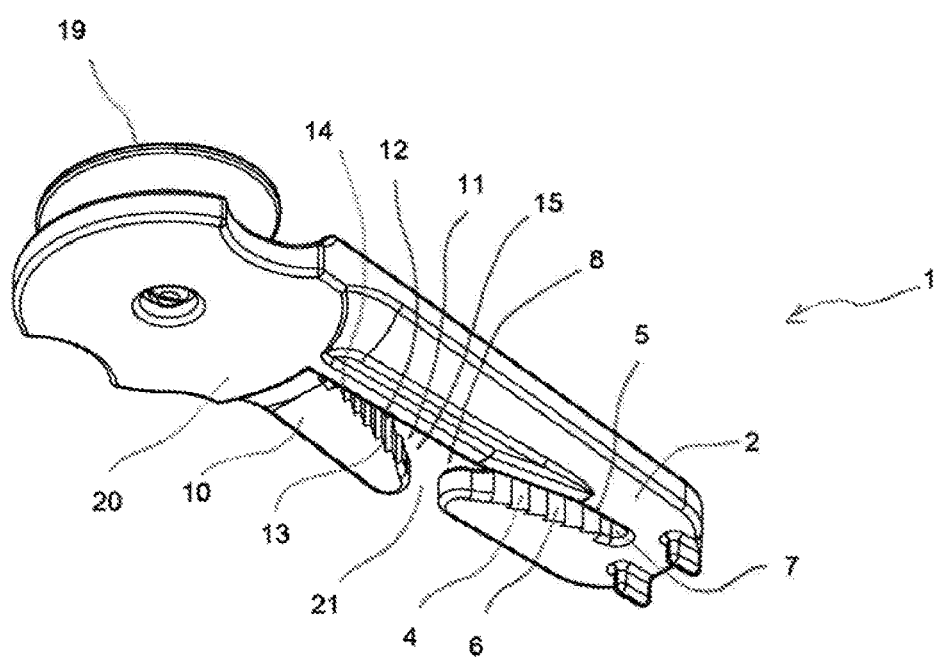
Figure 13:
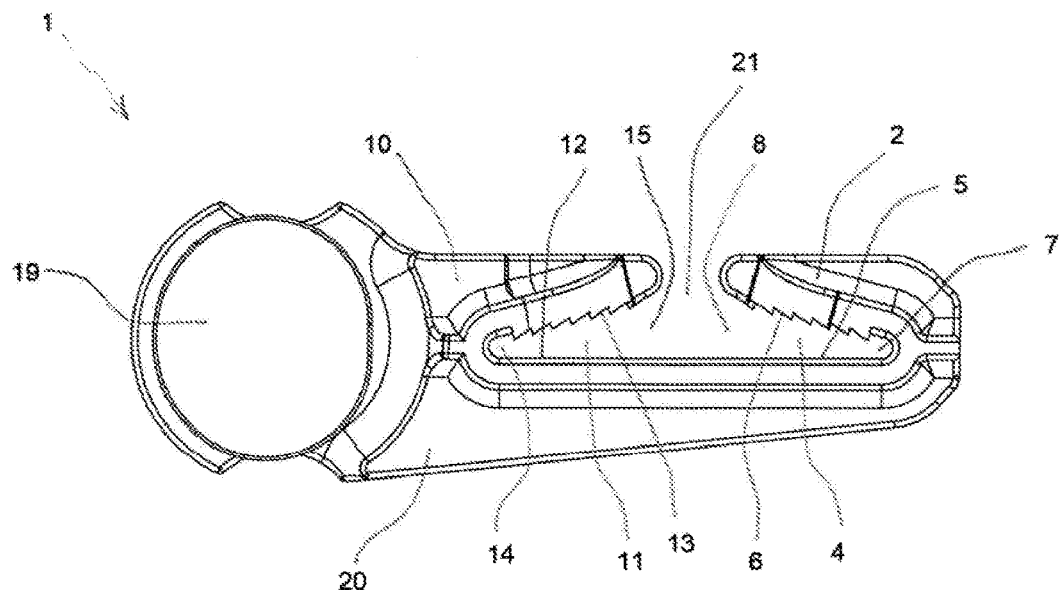
Figure 14:
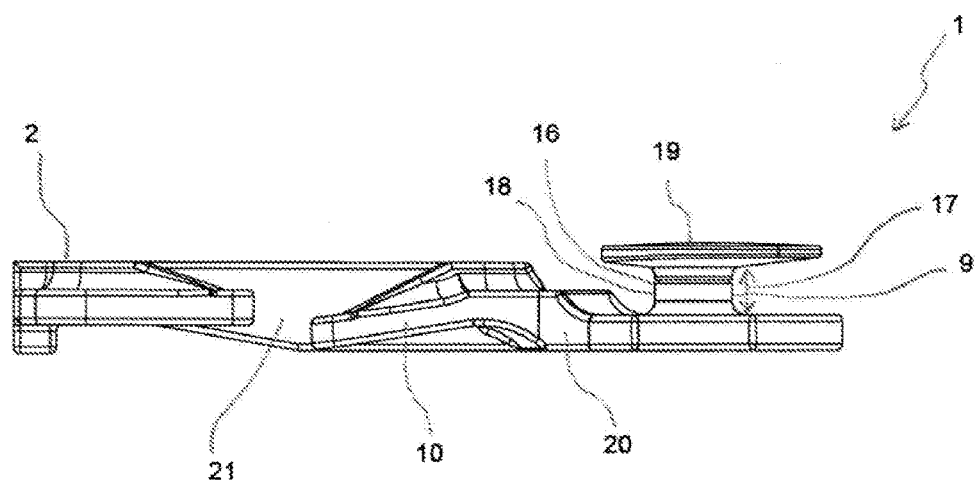
Figure 15:
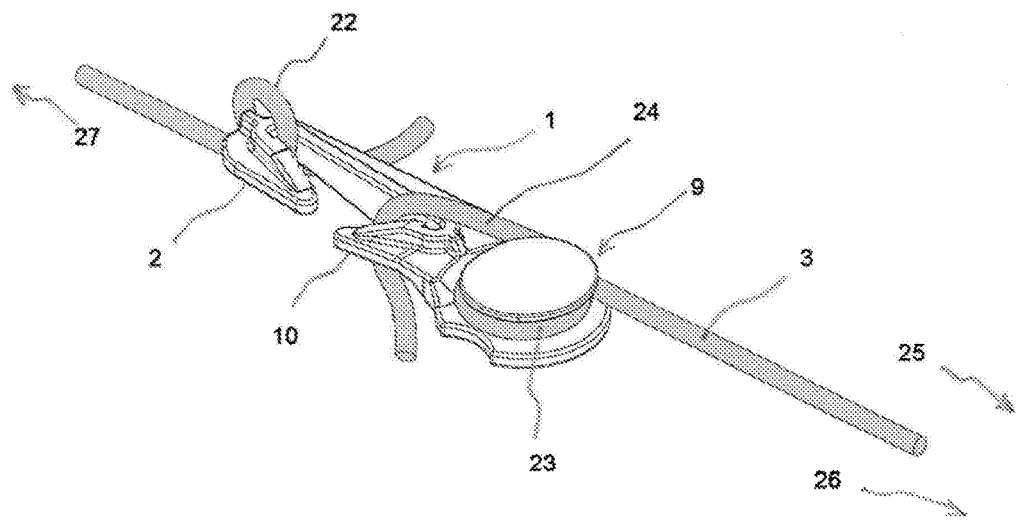
Figure 16:
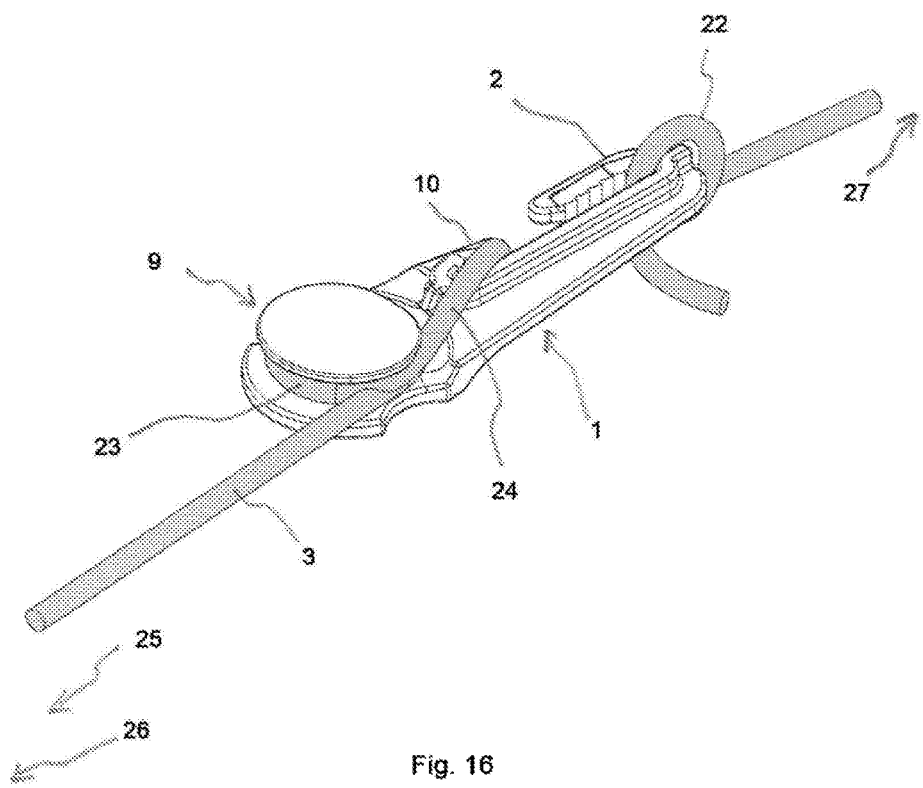
Figure 17:
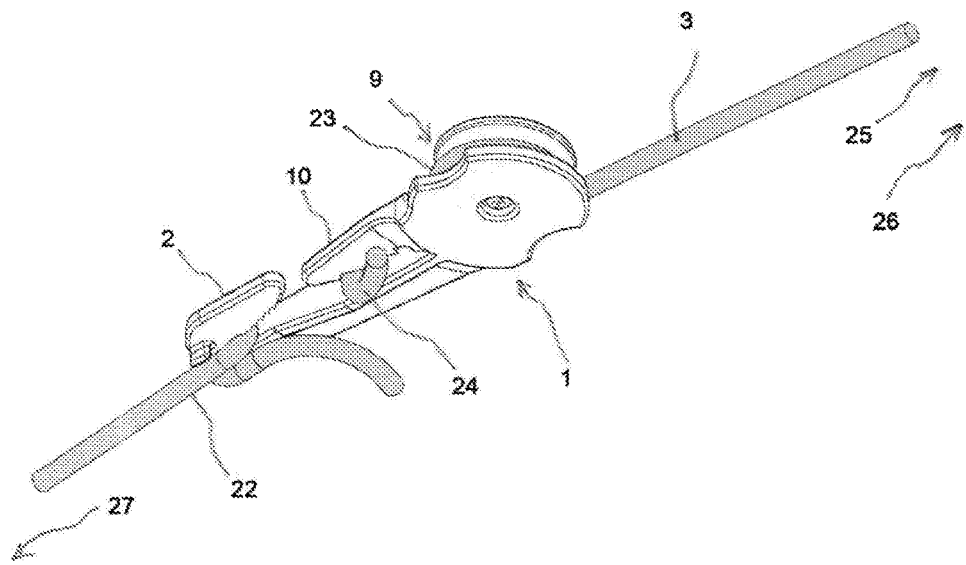
Figure 18:
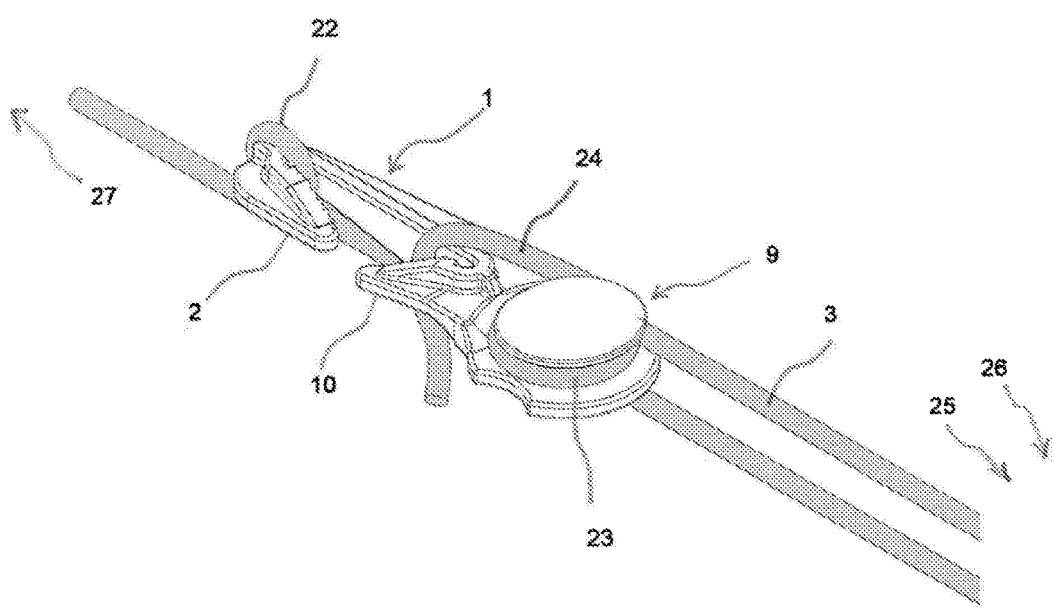
Figure 19:
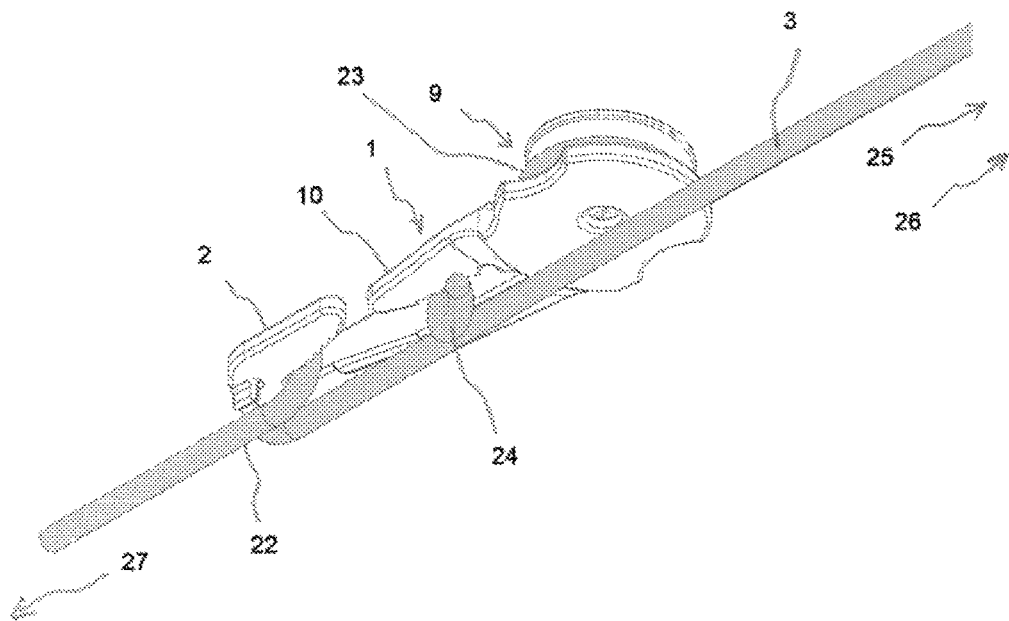
Figure 20:
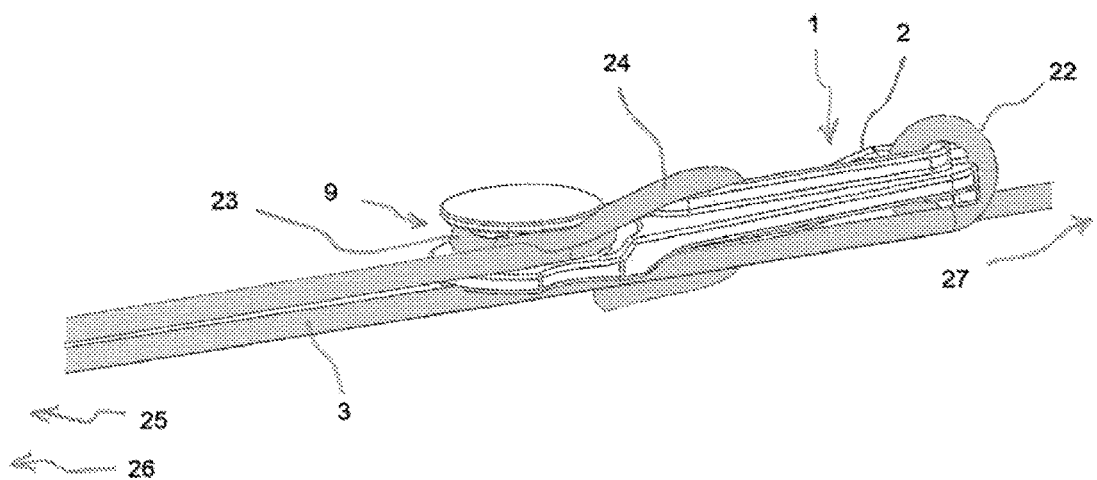

Preferred embodiments in accordance with the best mode of the present invention will now be described, by way of example only, with reference to the accompanying figures, in which:

FIG. 1 is a top perspective view of a line tensioner in accordance with an embodiment of the present invention;

FIG. 2 is a side elevation of the line tensioner shown in FIG. 1 when viewed from position A as indicated in FIG. 1;

FIG. 3 is a top perspective view of a line tensioner in accordance with another embodiment of the present invention;

FIG. 4 is a bottom perspective view of the line tensioner shown in FIG. 3;

FIG. 5 is a top plan view of the line tensioner shown in FIG. 3;

FIG. 6 is a side elevation of the line tensioner shown in FIG. 3 when viewed from position B as indicated in FIG. 3;

FIG. 7 is a top perspective view of a line tensioner in accordance with yet another embodiment of the present invention;

FIG. 8 is a bottom perspective view of the line tensioner shown in FIG. 7;

FIG. 9 is a top plan view of the line tensioner shown in FIG. 7;

FIG. 10 is a side elevation of the line tensioner shown in FIG. 7 when viewed from position C as indicated in FIG. 7;

FIG. 11 is a top perspective view of a line tensioner in accordance with a further embodiment of the present invention;

FIG. 12 is a bottom perspective view of the line tensioner shown in FIG. 11;

FIG. 13 is a top plan view of the line tensioner shown in FIG. 11;

FIG. 14 is a side elevation of the line tensioner shown in FIG. 11 when viewed from position D as indicated in FIG. 11;

FIG. 15 is a top perspective view of a line tensioner in accordance with another embodiment of the present invention;

FIG. 16 is another top perspective view of the line tensioner shown in FIG. 15;

FIG. 17 is a bottom perspective view of the line tensioner shown in FIG. 15;

FIG. 18 is a top perspective view of a line tensioner in accordance with a further embodiment of the present invention;

FIG. 19 is a bottom perspective view of the line tensioner shown in FIG. 18; and FIG. 20 is a side perspective view of the line tensioner shown in FIG. 18.

MODE FOR THE INVENTION

Mode for Invention

Referring to the figures, an embodiment of the present invention provides a line tensioner 1 comprising a first attachment portion 2 for releasably fixing to a line 3. The first attachment portion 2 has a slot 4 with two opposing surfaces 5 and 6 extending in a first direction from a throat 7 towards a mouth 8. The line 3 is receivable via the mouth 8 into releasable gripping engagement with the two opposing surfaces 5 and 6. The line tensioner 1 also comprises a bearing portion 9. The line 3 is slidably engagable with the bearing portion 9 for tensioning the line. The line tensioner further comprises a second attachment portion 10 for releasably fixing to the line 3. The second attachment portion 10 has a slot 11 with two opposing surfaces 12 and 13 extending in a second direction from a throat 14 towards a mouth 15. The line 3 is receivable via the mouth 15 into releasable gripping engagement with the two opposing surfaces 12 and 13. The second direction is opposite to the first direction.

The bearing portion 9 has a bearing surface 16. The line 3 is slidably engagable with the bearing surface 16. In one embodiment, the bearing surface 16 has a bearing width 17 and a minimum radius of curvature of 0.75 times the bearing width. The bearing width 17 is the width across which the line can sit on the bearing surface. The bearing width 17 corresponds to the maximum width of line that can be accommodated on the bearing surface 16. It has been found that a bearing surface 16 having a minimum radius of curvature of 0.75 times the bearing width 17 means that undue stress is not applied to the line accommodated on the bearing surface 16, especially when the line 3 is being tensioned. In particular, since the maximum width of line corresponds to the bearing width 17, any line being used with the line tensioner 1 will be bent around the bearing surface 16 with a minimum radius of curvature of 0.75 times the width (or diameter) of the line.

In the embodiment shown in the accompanying figures, the bearing surface 16 is an outer circumferential surface of a cylinder 18. The bearing surface 16 is also bounded on one side by a retaining flange 19 projecting away from the bearing surface to retain the line 3 over the bearing surface. The bearing surface 16 is bounded on the other side by both of the attachment portions 2 and 10. In particular, the attachment portions 2 and 10 form a plate 20 projecting away from the bearing surface 16 to retain the line over the bearing surface.

In other embodiments, the bearing surface 16 is bounded on one side by only one of the attachment portions 2 or 10, with this attachment portion projecting away from the bearing surface to retain the line 3 over the bearing surface. The other attachment portion can be located on the other side of the bearing surface 16, and can also form part of the retaining flange 19.

In yet other embodiments, the bearing portion 9 and the bearing surface 16 can be in other forms or configurations. For example, the bearing surface 16 can be the outer circumferential surface of a half- or part-cylinder. The bearing portion 9 can also be in the form of a hook with the bearing surface 16 being the inside curved surface of the hook. The bearing portion 9 can also be an aperture or a hole in a plate structure, with the bearing surface 16 being the inside curved surface of the aperture or hole.

Looking at the attachment portions in further detail, the two opposing surfaces 5 and 6 (or 12 and 13) of at least one of the slots 4 (or 11) diverge from the respective throat 7 (or 14) towards the respective mouth 8 (or 15). The respective mouth 8 (or 15) is thereby wider than the respective throat. In some embodiments, one or both of the slots 4 and 11 are cuneal or wedge-shaped.

The two opposing surfaces 5 and 6 (or 12 and 13) of at least one of the slots 4 (or 11) are mutually opposing surfaces. In other embodiments, the two opposing surfaces 5 and 6 (or 12 and 13) need not be mutually opposing. In the present embodiment, the two opposing surfaces 5 and 6 (and 12 and 13) of both the slots 4 (and 11) are mutually opposing surfaces.

In some embodiments, at least one of the mutually opposing surfaces 5 and 6 (or 12 and 13) of at least one of the slots 4 (or 11) comprises gripping elements. In other embodiments, both of the mutually opposing surfaces 5 and 6 (or 12 and 13) of at least one of the slots 4 (or 11) comprise gripping elements. The gripping elements are in the form of one or more teeth. In other embodiments, the gripping elements are in the form of one or more rough surface portions, one or more barbs, one or more tacky surface portions, or any other type of elements that increase the friction between at least one of the mutually opposing surfaces 5 and 6 (or 12 and 13) and the line 3.

In the embodiments shown in the figures, the attachment portions 2 and 10 share a common mouth 21. Thus, the slots 4 and 11 of the attachment portions 2 and 10 can be described as forming the opposing branches of one larger slot. One side of the larger slot is formed by one of the mutually opposing surfaces 5 and 12 of each slot 4 and 11, and the other side of the larger slot is formed by the other of the mutually opposing surfaces 6 and 13 of each slot 4 and 11. The surfaces 5 and 12 form a continuous surface in the larger slot, whereas the surfaces 6 and 13 are separated at the middle of the larger slot by the common mouth 21. The line 3 accesses the larger slot via the common mouth 21 and is then pushed down one of the throats 7 (or 14) into releasable gripping engagement with the corresponding two mutually opposing surfaces 5 and 6 (or 12 and 13).

Also as illustrated in the embodiments shown in the accompanying figures, the first attachment portion 2 is in alignment with the bearing surface 16. This means that, in use, when the first attachment portion 2 is attached to a line or an item there is a line of force along which the line tensioner 1 will be in tension when a line is pulled in tension across the bearing surface 16. When the first attachment portion 2 is in alignment with the bearing surface 16 as described above, the portions of the line 3 on either side of the bearing surface 16 are: in alignment with the line of force; equidistant on either side of the line of force; or angled from the line of force at the same angle. Thus, the first attachment portion 2 is in alignment with the bearing surface 16 such that, in use, portions of the line 3 that are in tension follow a substantially straight axis, or are symmetrically distributed about the line of force. The result is that the line tensioner 1 is much more stable than prior line tensioners and is not prone to twisting, especially when tension is applied to the line.

An embodiment of another aspect of the present invention provides a method of tensioning a line using an embodiment of the line tensioner provided by the present invention, such as the line tensioner 1 described above. As best shown in FIGS. 15 to 20, the embodiment of the method comprises: releasably fixing a first portion 22 of the line 3 to the first attachment portion 2; engaging a second portion 23 of the line 3 with the bearing portion 9; pulling a third portion 24 of the line 3, the second portion 23 of the line 3 being between the first 22 and third 24 portions of the line 3, such that the second portion 23 of the line 3 slides along and bears against the bearing portion 9 to tension the line; and releasably fixing the third portion 24 of the line 3 to the second attachment portion 10.

For example, and referring to FIGS. 15 to 17 to illustrate, the line tensioner 1 can be used with the line 3 to tie a bundle of items together. The first portion 22 of the line 3 is first releasably fixed to the first attachment portion 2. The remainder of the line 3 is then wrapped around the bundle of items. The second portion 23 of the line 3 is then engaged with the bearing portion 9. The third portion 24 of the line 3 is then pulled so that the second portion 23 slides along and bears against the bearing portion to tension the line around the bundle of items, thereby tying the bundle of items together. The third portion 24 is then releasably fixed to the second attachment portion 10.

In another embodiment, the above method comprises attaching an anchor portion 25 of the line 3 to a first item 26, the anchor portion of the line being between the first portion 22 and the second portion 23 of the line 3. This embodiment is useful for tying a first item 26 to a second item 27 so that the items are in relatively fixed relationship to one another. For example, the second item 27 can be in the form of a tarpaulin cover to be tied down to the first item 26 in the form of an anchor fixed to a vehicle or fixed to the ground. In particular, and referring to FIGS. 18 to 20 to illustrate, the line 3 is first tied to the tarpaulin cover 27 at a tie point along the line 3. Downstream of the tie point, the first portion 22 of the line 3 is releasably fixed to the first attachment portion 2. Downstream of the first portion 22, the anchor portion 25 is slidably engaged with the anchor 26 fixed on the vehicle or on the ground. Downstream of the anchor portion 25, the second portion 23 of the line 3 is then engaged with the bearing portion 9. The third portion 24 of the line 3 is then pulled so that the second portion 23 slides along and bears against the bearing portion 9, and the anchor portion 25 slides along and bears against the anchor 26, in order to tension the line between the tarpaulin cover 27 and the anchor 26. The third portion 24 is then releasably fixed to the second attachment portion 10.

An embodiment of a further aspect of the present invention provides a method of tensioning a line using an embodiment of the line tensioner provided by the present invention, such as the line tensioner 1 described above. FIGS. 15 to 17 can also be used to illustrate this embodiment. It should be noted, however, the first portion of the line 3 is designated as 22 in the embodiment described above, whereas the first portion of the line 3 is designated as 25 in the present embodiment. In particular, in the present embodiment, a first portion 25 of the line 3 is attached to a first item 26. The present embodiment of the method comprises: releasably fixing the first attachment portion 2 to a second item 27; engaging a second portion 23 of the line 3 with the bearing portion 9; pulling a third portion 24 of the line 3, the second portion 23 of the line 3 being between the first 25 and third 24 portions of the line 3, such that the second portion 23 of the line 3 slides along and bears against the bearing portion 9 to tension the line 3; and releasably fixing the third portion 24 of the line 3 to the second attachment portion 10.

For example, and still referring to FIGS. 15 to 17, the first item 26 can be in the form of an anchor fixed to a vehicle or fixed to the ground. The second item 27 can be in the form of a tarpaulin cover to be tied to the anchor 26. The first attachment portion 2 is releasably fixed to the tarpaulin cover 27. This can be done by tying a length of line to the tarpaulin cover 27, and then releasably fixing the length of line to the first attachment portion 2. Alternative, this can be done by simply hooking the attachment portion 2 into an eyelet in the tarpaulin cover 27. The first portion 25 of the line 3 is attached to the anchor 26. The second portion 23 of the line 3 is then engaged with the bearing portion 9. The third portion 24 of the line 3 is then pulled so that the second portion 23 slides along and bears against the bearing portion to tension the line between the tarpaulin cover 27 and the anchor 26. The third portion 24 is then releasably fixed to the second attachment portion 10. Thus, this embodiment and the embodiment illustrated in FIGS. 18 to 20 are both used to tie a first item 26 to a second item 27. However, the difference between this embodiment and the embodiment illustrated in FIGS. 18 to 20 is that the embodiment in FIGS. 18 to 20 use the one line 3, whilst the present embodiment uses the line 3 between the line tensioner 1 and the first item 26, and either another separate line between the line tensioner 1 and the second item 27 or simply attaches the line tensioner 1 directly to the second item 27.

It is to be appreciated that the aforesaid embodiments are only exemplary embodiments adopted to describe the principles of the present invention, and the present invention is not merely limited thereto. Various variants and modifications can be made by those of ordinary skill in the art without departing from the spirit and essence of the present invention, and these variants and modifications are also covered within the scope of the present invention. Accordingly, although the invention has been described with reference to specific examples, it can be appreciated by those skilled in the art that the invention can be embodied in many other forms. It can also be appreciated by those skilled in the art that the features of the various examples described can be combined in other combinations.

The invention claimed is:

1. A method of tensioning a line using a line tensioner, the line tensioner comprising:
   a first attachment portion for releasably fixing to a line, the first attachment portion having a slot with two opposing surfaces extending in a first direction from a throat towards a mouth, the line being receivable via the mouth into releasable gripping engagement with the two opposing surfaces;
   a bearing portion, the line being slidably engagable with the bearing portion for tensioning the line; and
   a second attachment portion for releasably fixing to the line, the second attachment portion having a slot with two opposing surfaces extending in a second direction from a throat towards a mouth, the line being receivable via the mouth into releasable gripping engagement with the two opposing surfaces, the second direction being opposite to the first direction, the method comprising:
 releasably fixing a first portion of the line to the first attachment portion;
 engaging a second portion of the line with the bearing portion;
 pulling a third portion of the line, the second portion of the line being between the first and third portions of the line, such that the second portion of the line slides along and bears against the bearing portion to tension the line; and
 releasably fixing the third portion of the line to the second attachment portion.

2. A method according to claim 1 comprising attaching an anchor portion of the line to a first item, the anchor portion of the line being between the first and second portions of the line.

3. A method of tensioning a line using a line tensioner, the line tensioner comprising:
 a first attachment portion for releasably fixing to a line, the first attachment portion having a slot with two opposing surfaces extending in a first direction from a throat towards a mouth, the line being receivable via the mouth into releasable gripping engagement with the two opposing surfaces;
 a bearing portion, the line being slidably engagable with the bearing portion for tensioning the line; and
 a second attachment portion for releasably fixing to the line, the second attachment portion having a slot with two opposing surfaces extending in a second direction from a throat towards a mouth, the line being receivable via the mouth into releasable gripping engagement with the two opposing surfaces, the second direction being opposite to the first direction, wherein a first portion of the line is attached to a first item, the method comprising:
 releasably fixing the first attachment portion to a second item;
 engaging a second portion of the line with the bearing portion;
 pulling a third portion of the line, the second portion of the line being between the first and third portions of the line, such that the second portion of the line slides along and bears against the bearing portion to tension the line; and
 releasably fixing the third portion of the line to the second attachment portion.

* * * * *